US008675587B2

(12) United States Patent
Puthenpura et al.

(10) Patent No.: US 8,675,587 B2
(45) Date of Patent: Mar. 18, 2014

(54) METHOD AND APPARATUS FOR PLANNING RADIO FREQUENCY SPECTRUM IN A FIXED WIRELESS NETWORK

(75) Inventors: Sarat Puthenpura, Berkeley Heights, NJ (US); David G Belanger, Hillsborough, NJ (US); Sam Houston Parker, Cranbury, NJ (US); Ravi Raina, North Brunswick, NJ (US); Huahui Wang, East Hanover, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/315,025

(22) Filed: Dec. 8, 2011

(65) Prior Publication Data
US 2012/0082115 A1  Apr. 5, 2012

(51) Int. Cl.
 H04W 4/00 (2009.01)
 H04W 40/00 (2009.01)
 H04W 72/00 (2009.01)

(52) U.S. Cl.
 USPC .................. 370/329; 455/446; 455/452.2

(58) Field of Classification Search
 None
 See application file for complete search history.

(56) References Cited

U.S. PATENT DOCUMENTS

| | | | |
|---|---|---|---|
| 6,253,086 B1* | 6/2001 | Parantainen et al. | 455/446 |
| 7,634,536 B2* | 12/2009 | Halasz | 709/203 |
| 2002/0173315 A1* | 11/2002 | Chmaytelli et al. | 455/453 |
| 2003/0129987 A1* | 7/2003 | Tanay et al. | 455/450 |
| 2003/0134641 A1* | 7/2003 | Gustafsson | 455/446 |
| 2006/0063500 A1* | 3/2006 | Matoba et al. | 455/180.1 |
| 2006/0234719 A1* | 10/2006 | Demirhan et al. | 455/453 |
| 2008/0016190 A1* | 1/2008 | Halasz | 709/220 |
| 2008/0081633 A1* | 4/2008 | Oteri et al. | 455/452.1 |
| 2008/0165732 A1* | 7/2008 | Kim et al. | 370/329 |
| 2008/0261613 A1* | 10/2008 | Anderson et al. | 455/456.1 |
| 2009/0088171 A1* | 4/2009 | Aoyama et al. | 455/446 |
| 2010/0056163 A1* | 3/2010 | Schmidt et al. | 455/446 |
| 2010/0311426 A1* | 12/2010 | Muller | 455/446 |
| 2011/0044227 A1* | 2/2011 | Harrang et al. | 370/312 |
| 2011/0077015 A1* | 3/2011 | Saily et al. | 455/450 |
| 2011/0124346 A1* | 5/2011 | Kobayashi | 455/452.2 |
| 2011/0143807 A1* | 6/2011 | Aue et al. | 455/522 |
| 2011/0243090 A1* | 10/2011 | Grovlen et al. | 370/329 |
| 2011/0263265 A1* | 10/2011 | Caretti et al. | 455/450 |
| 2011/0300871 A1* | 12/2011 | Dottling et al. | 455/446 |
| 2011/0305211 A1* | 12/2011 | Lunttila et al. | 370/329 |

OTHER PUBLICATIONS

3rd Generation Partnership Project; Technical Specification Group Radio Access Network; Evolved Universal Terrestrial Radio Access (E-UTRA); Physical Channels and Modulation (Release 5)—3GPP TS 36.211 v9.1.0, Mar. 2010, entire document.*

* cited by examiner

*Primary Examiner* — Suk Jin Kang

(57) ABSTRACT

A method and apparatus for selecting a bandwidth option for a cell in a network are disclosed. For example, the method obtains, for the cell, network traffic data for a geographical area for mobility traffic and fixed wireless traffic, a physical characteristic of an antenna in the geographical area, and a type of connectivity at a customer premise, determines a busy time data traffic from the network traffic data for both the fixed wireless traffic and the mobility traffic, determines, for the cell, a cell range from the physical characteristic of the antenna and the type of connectivity at the customer premise, selects a bandwidth option from a plurality of bandwidth options, and determines an average throughput in accordance with the bandwidth option that is selected and the cell range, wherein the average throughput comprises a throughput for serving both the mobility traffic and the fixed wireless traffic.

19 Claims, 9 Drawing Sheets

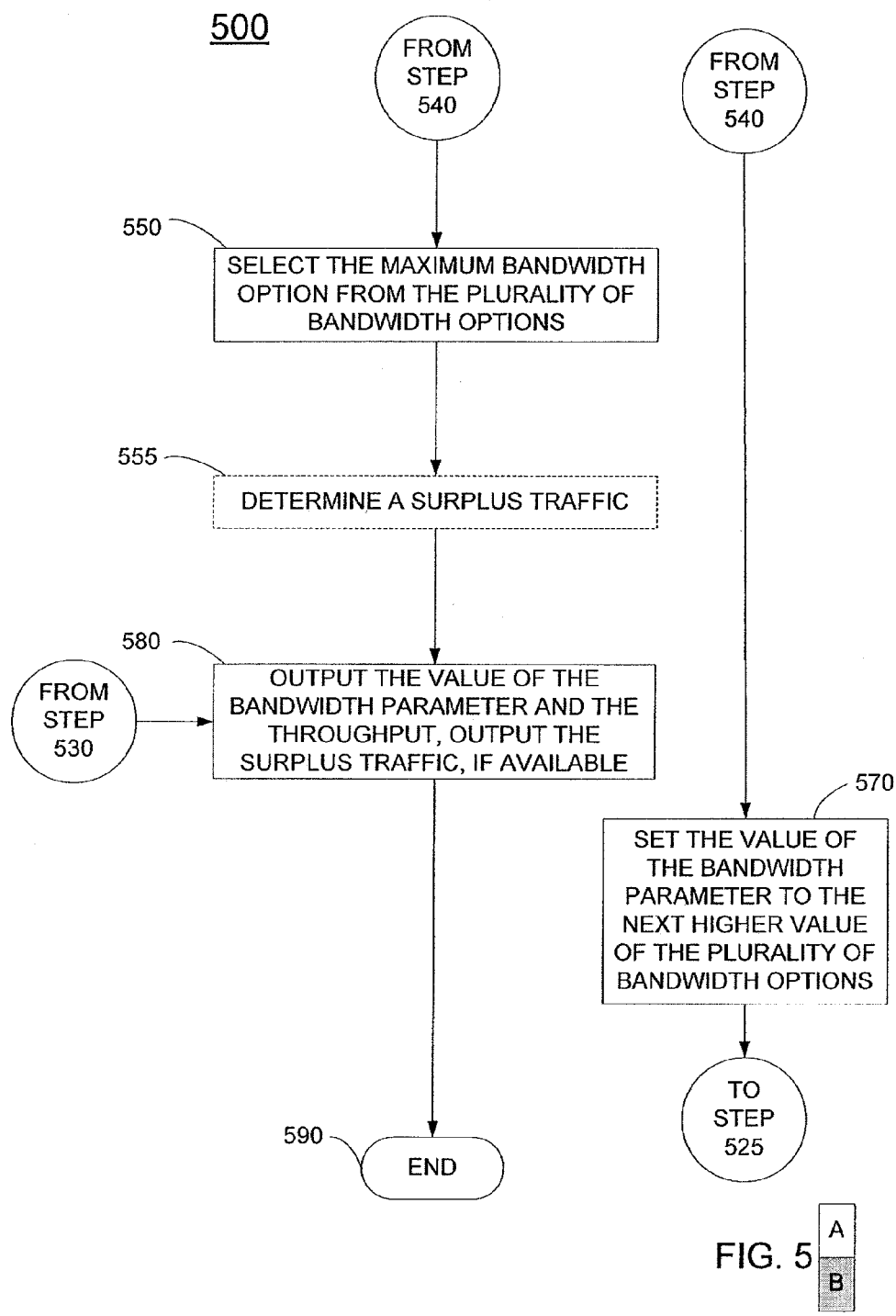

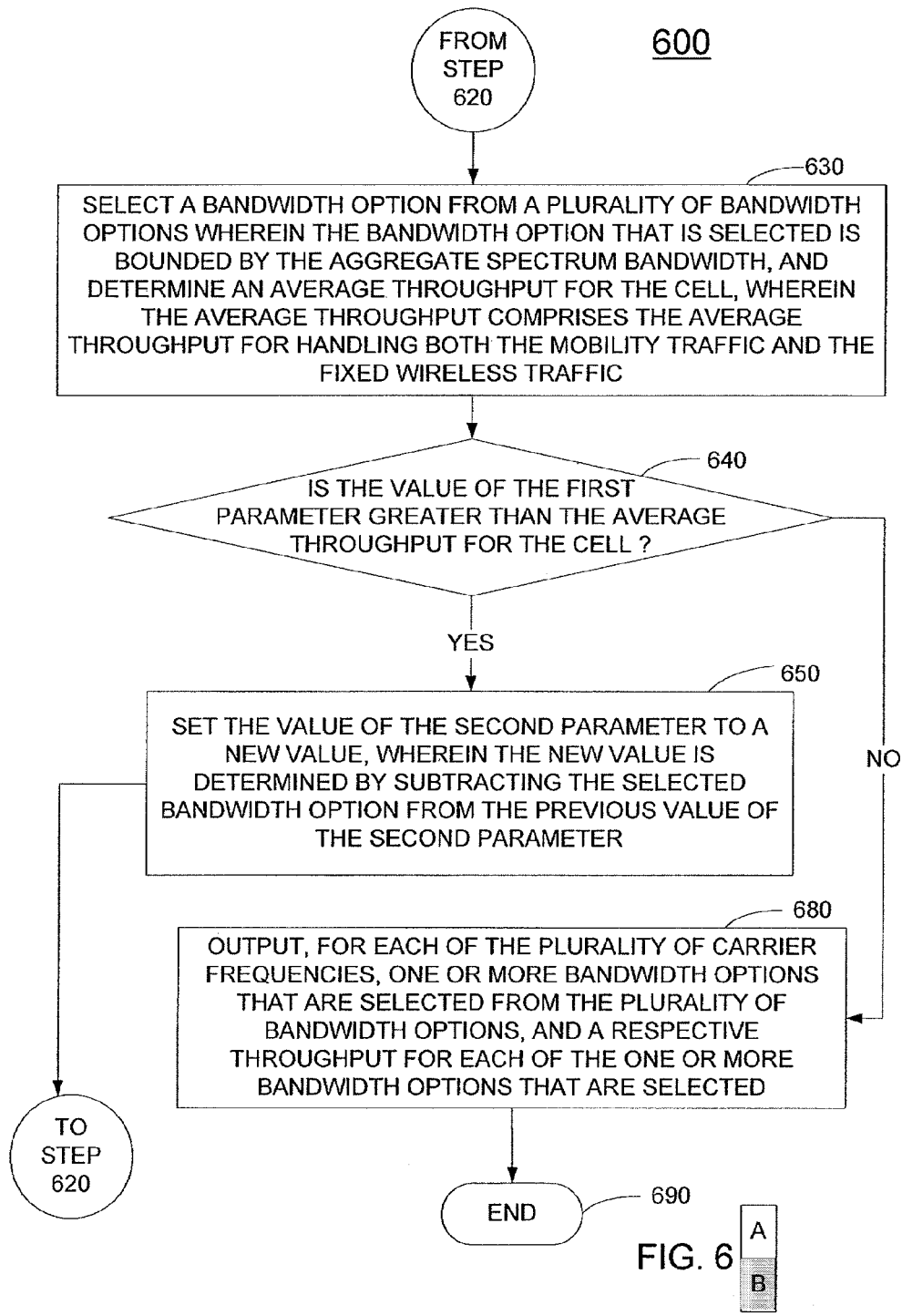

METHOD AND APPARATUS FOR PLANNING RADIO FREQUENCY SPECTRUM IN A FIXED WIRELESS NETWORK

The present disclosure relates generally to communication networks and, more particularly, to a method and apparatus for planning radio frequency spectrum in a fixed wireless network, e.g., a long term evolution (LTE) based fixed wireless network.

BACKGROUND

As Internet usage continues to grow, more and more customers are accessing communications services via a mobile device, e.g., a cell phone, a smart phone, etc. For example, a customer may receive multimedia content via his/her cell phone. The cell phone transmits and receives voice and data packets to and from the service provider's network via a base station and an access network.

The customer's ability to access services via a wireless device is dependent on the availability of capacity on various network elements, e.g., radio access networks, cell site equipment, and so on. In order to keep up with the demand, the expansion of cellular networks requires tremendous capital infusion. Unfortunately, it is very difficult to forecast the demand for the cell sites and/or radio access networks.

SUMMARY OF THE DISCLOSURE

In one embodiment, the present disclosure teaches a method and apparatus for selecting a bandwidth option for a cell in a network. For example, the method obtains, for the cell, network traffic data for a geographical area for mobility traffic and fixed wireless traffic, a physical characteristic of an antenna in the geographical area, and a type of connectivity at a customer premise, determines a busy time data traffic from the network traffic data for both the fixed wireless traffic and the mobility traffic, determines, for the cell, a cell range from the physical characteristic of the antenna and the type of connectivity at the customer premise, selects a bandwidth option from a plurality of bandwidth options, and determines an average throughput in accordance with the bandwidth option that is selected and the cell range, wherein the average throughput comprises a throughput for serving both the mobility traffic and the fixed wireless traffic.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly teaches a method and apparatus for planning radio frequency spectrum in a fixed wireless network, e.g., in a long term evolution (LTE) based fixed wireless network and the like. Although the teachings of the present disclosure are discussed below in the context of an LTE network, the teaching is not so limited. Namely, the teachings of the present disclosure can be applied for other types of wireless networks or cellular networks (e.g., 2G network, 3G network and the like), wherein planning of a radio frequency spectrum is beneficial.

Figure 1:
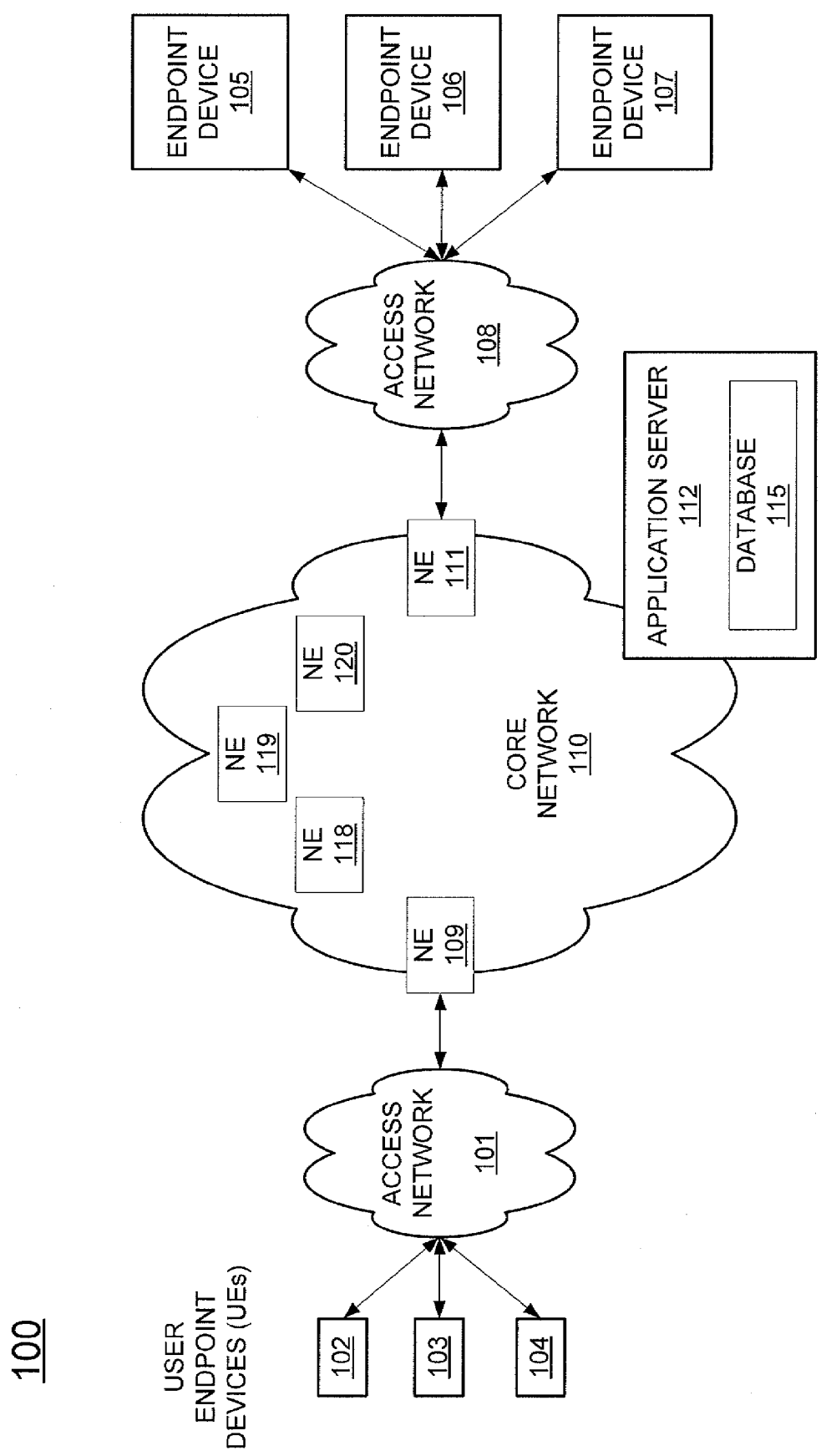
FIG. 1 is a block diagram depicting an illustrative network related to the current disclosure.

FIG. 1 is a block diagram depicting an illustrative network 100 related to the current disclosure. Illustrative networks may include Internet Protocol (IP) networks, Ethernet networks, wireless networks, cellular networks, and the like.

In one embodiment, the network may comprise a plurality of user endpoint devices (UEs) 102-104 configured for communication with the core network 110 (e.g., an IP based core backbone network supported by a service provider) via an access network 101. Similarly, a plurality of endpoint devices 105-107 are configured for communication with the core network 110 via an access network 108. The network elements 109 and 111 may serve as gateway servers or edge routers for the network 110.

The endpoint devices 102-107 may comprise customer endpoint devices such as personal computers, laptop computers, servers, routers, wireless phones, cell phones, smart phones, computing tablets, and the like. The access networks 101 and 108 serve as a means to establish a connection between the endpoint devices 102-107 and the NEs 109 and 111 of the core network 110. The access networks 101 and 108 may each comprise a Digital Subscriber Line (DSL) network, a broadband cable access network, a Local Area Network (LAN), a Wireless Access Network (WAN), a Radio Access Network (RAN), a cellular network, a Wi-Fi network, a 3$^{rd}$ party network, and the like. The access networks 101 and 108 may be either directly connected to NEs 109 and 111 of the core network 110, or indirectly through another network.

Some NEs (e.g., NEs 109 and 111) reside at the edge of the core infrastructure and interface with customer endpoints over various types of access networks. An NE that resides at the edge of a core infrastructure can be implemented as an edge router, a media gateway, a border element, a firewall, a switch, and the like. An NE may also reside within the network (e.g., NEs 118-120) and may be used as a mail server, a router, or like device. The core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements are depicted in FIG. 1, the communication system 100 may be expanded by including additional endpoint devices, access networks, network elements, and/or application servers, without altering the teachings of the present disclosure. The above network 100 is described to provide an illustrative environment in which data for various services, e.g., voice, data, and/or multimedia services, are transmitted on networks.

In one embodiment, a service provider may enable customers to access services via a wireless access network. For example, a customer may use a cell phone to access Internet Protocol (IP) services, multimedia services, and the like. The packets from and to the wireless device, e.g., a cell phone or a smart phone, may then traverse one or more radio access networks and equipment, e.g., base stations, backhaul equipment, etc.

In order to ensure capacity is available to serve the customers, the service provider may forecast the demand for the cell sites and/or radio access networks. Equipment such as antennas, base stations, backhaul equipment, and the like may then be deployed accordingly. However, keeping up with the demand by adding more and more network equipment requires tremendous capital infusion. Thus, the service provider may wish to improve the utilization of available network resources. In addition, some networks have more flexibility as compared to other networks. For example, universal mobile telecommunication systems (UMTSs) and wideband code division multiple access (WCDMA) systems have a fixed bandwidth of 5 MHz. However, long term evolution (LTE) networks have at least six bandwidth options. The bandwidth options for an LTE comprise at least one of: 1.4 MHz, 3 MHz, 5 MHz, 10 MHz, 15 MHz and 20 MHz. For example, a particular cell of an LTE network may have all of the above six spectral bandwidth options available.

Moreover, the demand for the cell sites and/or radio access networks may be for different types of traffic with different expectation levels. For example, the traffic may be for customers needing mobility service or for customers needing a "fixed" wireless service. For example, in urban areas, the customer may be using the cell phone in addition to other services, e.g., other wire-based services. Thus, the customer may be using the cell phone while mobility is needed. However, in other areas, the cell phone may be used as a "fixed" wireless device. For example, the customer may be located at a rural area were the customer has no access to wire-based services. Therefore, the customer may be using the cell phone for all communications—regardless of the need for mobility. Thus, "fixed" wireless service refers to a wireless service that is anticipated that the customer will not likely be mobile when accessing the wireless service, e.g., when the user is at the user's home or the user's office. This scenario equates to the scenario when a user may drop his land line service (broadly wired service, e.g., a home land line or an office land line) and simply relies on the mobile cellular service for all of his communication need. It is anticipated that the user will use a substantial amount of communication bandwidth while the user is at a fixed location, e.g., at his home or his place of employment (e.g., an Office).

Customers accessing services while being mobile understand that cell coverage may not be available everywhere and calls may be dropped. In addition, the mobile customers also expect the throughput level and quality of service to vary. However, customers expect to receive the same quality of service, consistency of coverage, throughput level, etc. while being at a fixed location. In other words, a customer who is using a mobile device in place of an endpoint device that is traditionally serviced by a fixed wired network, may continue to expect the reliability and quality of service of a wired network.

In one embodiment, the present disclosure provides a method for planning radio frequency spectrum for a fixed wireless network. The planning of the present disclosure is based on the bandwidth need and frequency spectrum constraint for each cell in the network. However, proper dimensioning and determination of a required bandwidth depends on several factors.

For example, the bandwidth need of the particular cell may be based on forecast data, a traffic mix of the mobility traffic and the fixed wireless traffic, a consideration of change in traffic pattern when new applications emerge, a consideration of bandwidth for uplink data transmission of mobility traffic, a consideration of bandwidth for uplink data transmission of fixed wireless traffic, a consideration of bandwidth for downlink data transmission of mobility traffic, a consideration of bandwidth for downlink data transmission of fixed wireless traffic, etc. The traffic mix refers to a ratio a proportion of the total traffic attributable to mobility traffic versus a proportion of the total traffic attributable to the fixed wireless traffic.

The spectrum requirements and availability may be based on several factors. For example, the factors that affect the spectrum requirements for each cell may comprise one or more of: forecasted busy-hour cell traffic for mobility traffic, forecasted busy-hour cell traffic for fixed wireless traffic, target spectrum utilization limits for both mobility and fixed wireless traffic, availability of multiple carrier frequencies, terrain type, power limits on user endpoint devices, types of user endpoint devices, power limits on base stations, antenna tilts, etc. The different types of user endpoint devices are used for different types of connectivity at the customer location. For example, one type of connectivity may be through an outdoor antenna. A second type of connectivity may be through an Ethernet cable being used for completely indoor connections.

In order to more clearly illustrate the coverage area, the concept of a sector in a base station will first be described. In one embodiment, a base station for a wireless network may be deployed with one or more directional antennas that cover a predetermined portion of the 360 degree angle. The coverage of one directional antenna is determined by dividing the 360 degrees by the number of directional antennas included in the base station. A portion of a wireless network that is covered with one directional antenna is referred to as a sector. For example, if there are three directional antennas at a base station, each directional antenna covers 120 degrees, thereby resulting in three sectors. The base station may also be referred to as a three sector base station. A cell is a geographical area that may be served by a number of base stations. For example, if each cell is defined as a geographical area shaped like a hexagon, the base stations may be located at the corners of the hexagons. The three directional antennas may then be directed to provide coverage for three different cells.

In one embodiment, each sector uses a predetermined portion of available frequency resources such that adjacent sectors may assign channels in mutually exclusive frequency ranges. However, it should be noted that other cellular networks may assign frequency ranges in a different manner and the present disclosure is not limited in this aspect. For example, each of the three sectors above may use one third of available frequency resources. Adjacent sectors may use different frequency ranges. The channels for adjacent sectors are then assigned in mutually exclusive frequency ranges such that interference is minimized.

A coverage area (geographical range) of a sector may depend on a number of factors, e.g., frequency band, terrain, antenna height, antenna tilt, antenna azimuth, transmitted power level, etc. The geographical range of a sector may be approximated by a circle. The circle may be referred to as a traffic circle. The traffic circle may be visualized as being a circle on the ground below the antenna in a base station, covering the geographical range for the antenna sector.

Figure 2:
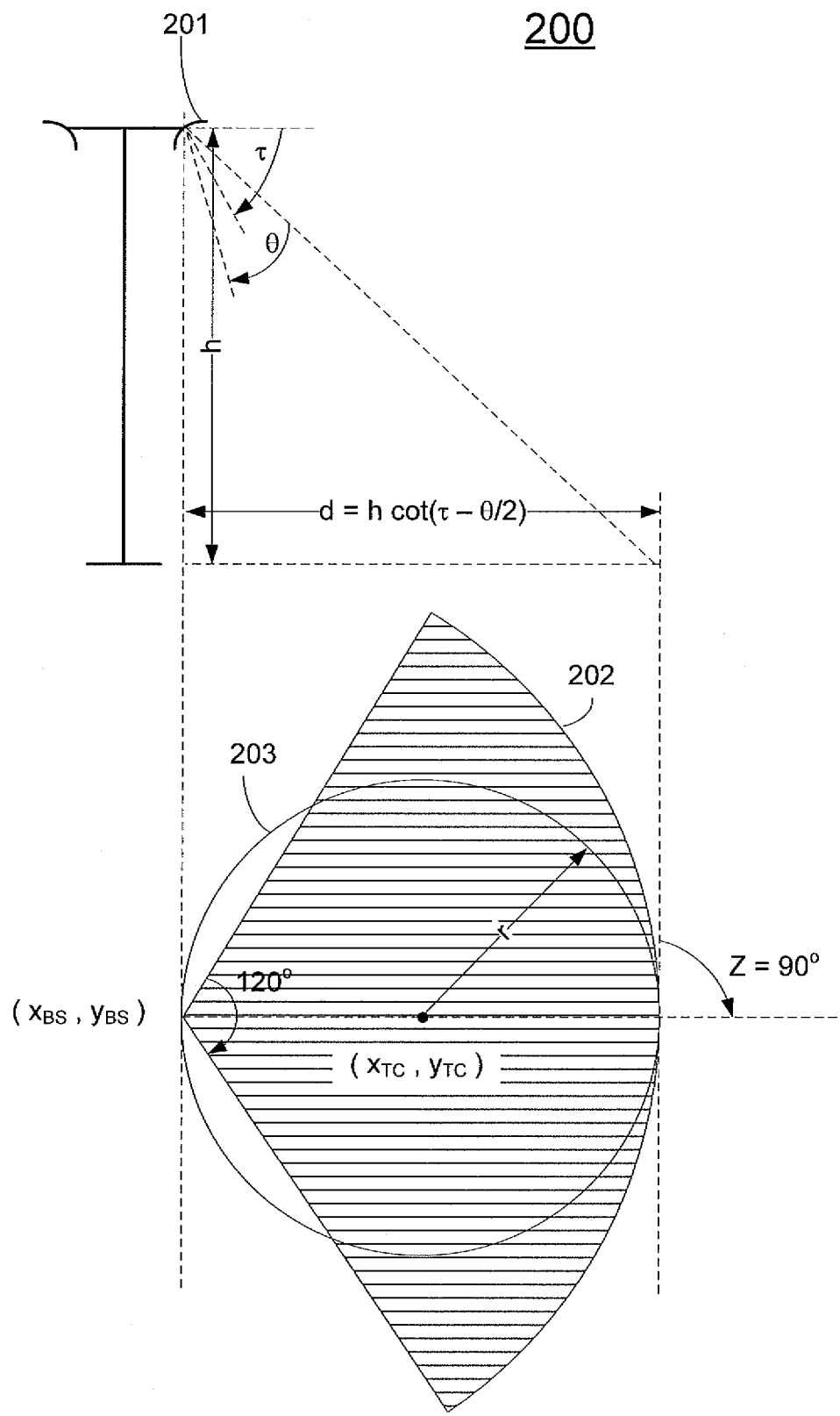
FIG. 2 provides an exemplary illustration of a traffic circle for an antenna of the current disclosure.

FIG. 2 provides an exemplary illustration 200 of a traffic circle for an antenna of the current disclosure. The exemplary illustration 200 is that of an antenna 201. The antenna 201 has a geographical range 202 which may be approximated by the traffic circle 203. The physical characteristics of the antenna 201 are denoted as follows:

τ: Tilt angle of the antenna;
θ: Vertical beam width of the antenna;
h: Height of the antenna;
d: Geographical range of the sector in the base station;
Z: Azimuth of the antenna (90 degree in this example);
$(X_{BS}, Y_{BS})$: Cartesian coordinate location of the antenna in the base station; and
$(X_{TC}; Y_{TC})$: Cartesian coordinate location of the center of the traffic circle.

The radius of the traffic circle r is then:

$$r = \frac{d}{2}, \text{ wherein } d = h\mathrm{Cot}(\tau - \theta/2). \quad (1)$$

For example, for an antenna with h=60 meters, τ=7.6°, θ=1°, then, d=482 meters and r=241 meters.

The Cartesian coordinate location of the center of the traffic circle is determined using the following equations:

$$X_{TC} = X_{BS} + (d \sin Z)/2 \quad (2)$$

$$Y_{TC} = X_{BS} + (d \cos Z)/2 \quad (3)$$

$(X_{TC}, Y_{TC}, r)$ denotes the circular coordinate of the sector. (4)

In the above determination of the range of the antenna, the tilt angle of the antenna was used in equation (1). However, in some scenarios the tilt angle may either be unavailable or set to zero. In one embodiment, the current method provides another method of estimating the range d from the transmitted power of the base station as follows:

Let, X: Transmitted power of the base station in dBm;
Y: An estimate of the received signal strength in dBm determined using a Hata-Okamura wireless signal propagation model of equation (5), provided below;
f: Carrier frequency of base station antenna in Mhz;
h: Height of the antenna in meters; and
d: range of the antenna in meters.

The default values for the parameters in the Hata-Okamura wireless signal propagation model (on the dB scale) depend on the carrier frequency of the base station antenna. For example, the default values for the parameters for carrier frequencies of 900 Mhz and 1800 Mhz are:
A=69.55 (for f=900 Mhz) and A=46.30 (for f=1800 Mhz);
B=26.16 (for f=900 Mhz) and B=33.90 (for f=1800 Mhz);
C=−13.82; D=44.90; and E=−6.55.

Then, $$Y = X - A - B\log(f) - C\log(h) - (D + E\log(h)) \cdot \log(d/1000). \quad (5)$$

Therefore, if $Y_{min}$ is a minimum limit on the received signal strength (e.g., −120 dBm), then the range of antenna (d) in meters is given by:

$$d = 1000 \times 10 \wedge \left\{ \frac{X - A - B\log(f) - C\log(h) - Y}{D + E\log(h)} \right\}. \quad (6)$$

In one embodiment, the current method combines the above two ways of estimating d as follows:

$$d = \mathrm{Min}\left[h\mathrm{Cot}(\tau - \theta/2), 1000 \times 10 \wedge \left\{ \frac{X - A - B\log(f) - C\log(h) - Y}{D + E\log(h)} \right\} \right] \quad (7)$$

The method then uses equations (1) to (3) to determine the $(X_{TC}, Y_{TC}, r)$.

Similarly, $(X_{TC}, Y_{TC}, r)$ and the range of an antenna in a base station can be determined for other carrier frequencies using an appropriate set of default values for the parameters in the Hata-Okamura wireless signal propagation model. For example, carrier frequency bands deployed for an LTE base station may comprise: 700 MHz, 850 MHz, 1900 MHz, etc.

In one embodiment, the present method provides planning of a radio frequency spectrum. The method determines, for each antenna in a cell site, a spectrum requirement and a range. Note that the spectrum requirement and the range considered for each antenna is only the portion providing coverage for a specific cell. For example, for the three-directional antenna described above, the coverage for traffic to and from a specific hexagonal shaped geographical area is considered. For example, the antenna coverage over the 120 degree (described above) of the three-directional antenna is considered. As such, the spectrum requirement and range are referred to as a spectrum requirement for a cell, and a cell range or a coverage area for a cell.

The spectrum requirement and cell range may be determined based on one or more of: a targeted spectrum utilization level for mobility traffic and fixed wireless traffic, terrain, carrier frequency, forecast of cell traffic for both mobility and fixed wireless traffic, transmitted power levels of the base station, transmitted power levels of UEs, types of UEs, antenna tilts, antenna azimuth, antenna height, vertical beam width of the antenna, etc. The cell range for a particular cell may be limited by the range for a downlink transmission or the range for an uplink transmission. For example, the power levels for transmitting in the uplink and downlink directions may be different. In addition, the cell range may depend on a type of connectivity at the customer premise. For example, some customers may have a premise with an outdoor antenna while other customers do not have an outdoor antenna. Furthermore, receiver sensitivity levels on base stations may be different from the levels on UE devices.

In one embodiment, the present method determines the cell range as a minimum of the ranges in the uplink and downlink (transmission) directions. In one embodiment, the present disclosure determines the cell range in downlink direction, $d_{dl}$, in accordance with: base station antenna height, vertical beam width of base station antenna, and tilt of base station antenna. In one embodiment, the method determines the cell range in the downlink direction based on a type of connectivity at the customer premise. For example, the method may determine whether an outdoor antenna is available at the customer premise. The method may then provide two values for the cell range in the downlink direction: one value based on an assumption of an outdoor antenna not being available at the customer premise, and a second value based on an outdoor antenna being available at the customer premise.

In one embodiment, the present disclosure determines the cell range in uplink direction, $d_{ul}$, in accordance with: a base station receiver sensitivity, fractional power control (FPC) parameters, and UE power limits. In order to determine the cell range in the uplink direction, the method first determines a maximum path loss budget by performing link budget analysis. The method then maps the path loss budget to the frequency range of the uplink transmission in accordance with the carrier frequency and a propagation model for radio waves. The cell range in the uplink direction for the particular carrier frequency and path loss budget are then determined.

In one embodiment, the method determines the cell range in the uplink direction based on a type of connectivity at the customer premise. For example, the method may provide two values for the cell range in the uplink direction: one value based on an assumption of an outdoor antenna not being available at the customer premise, and a second value based on an outdoor antenna being available at the customer premise.

The method then determines the cell range as the minimum of the uplink and downlink cell ranges. For example, the cell range may be derived as follows: cell range=min$\{d_{ul}, d_{dl}\}$. In one embodiment, the cell range may be based on the type of connectivity at the customer premise. For example, the method may provide two values for the cell range: one value based on an assumption of an outdoor antenna not being available at the customer premise, and a second value based on an outdoor antenna being available at the customer premise. For instance, a customer site located further than a first distance from the cell site may need an outdoor antenna. In another example, a customer site located further than a second distance from the cell site may not achieve a desired service level, even if an outdoor antenna is available, and so on.

The method then proceeds to determine the appropriate bandwidth dimension for meeting the traffic requirements in both the uplink and downlink directions in accordance with the cell range. For example, the method obtains busy hour data traffic, $R_{req}$, from forecast traffic of the radio access network for both mobility and fixed wireless traffic. For example, the fixed wireless traffic may impose a more stringent requirement on the throughput level as compared to that imposed for mobility traffic. For instance, the throughput level for the fixed portion of the traffic mix may be 100% of the demand, while the throughput level for the mobility portion of the traffic mix may be 90%, etc. The traffic mix may then be used to determine the appropriate value for $R_{req}$. The method then determines the smallest bandwidth option, BW, such that the average throughput of the cell exceeds the above busy hour data traffic for providing service for both the fixed wireless traffic and the mobility traffic. For example, the method then determines BW, such that $R_{cell} > R_{req}$, wherein the required throughput takes into account the mix of traffic. The mix of traffic refers to the proportion of the total traffic attributed to mobility traffic and the proportion of the total traffic attributed to fixed wireless traffic.

It should be noted that the "busy hour" data traffic only refers to the peak traffic forecast volume (throughput) and the time at which the peak traffic volume occurs. It is not limited to the unit of measure of an "hour", but may be simply be referred to as a "busy time" of any unit of time measures, e.g., based on a minute, several minutes, an hour, several hours, and so on.

In one embodiment, BW is determined by first setting the value of BW to the minimum value of the six bandwidth options, determining the average throughput of the cell, $R_{cell}$, in accordance with the cell range and BW, iteratively increasing the value of the BW to the next higher bandwidth option among the six options, until either all options are exhausted or a value is determined for BW (i.e., one of the six options), such that $R_{cell} > R_{req}$.

For example, the BW may first be set to 1.4 MHz. The throughput of the cell, $R_{cell}$, for BW=1.4 MHz and the cell range determined above is then determined. If $R_{cell} > R_{req}$, the BW (i.e., 1.4 MHz) and $R_{cell}$ are provided as an output. Otherwise, the BW is set to the next bandwidth option. For example, the BW may be set to 3 MHz. The throughput of the cell, $R_{cell}$, for BW=3 MHz and the cell range is then determined. If $R_{cell} > R_{req}$, the BW (i.e., 3 MHz) and $R_{cell}$ are provided as an output. Otherwise, the BW is set to the next bandwidth option. The process continues until a value is successfully determined for BW such that $R_{cell} > R_{req}$. If a value is successfully determined for BW, the method outputs the value of the BW as the appropriate bandwidth for meeting the traffic requirements. The method also outputs the corresponding throughput for the cell, $R_{cell}$.

If all options get exhausted before a value among the six options is found such that $R_{cell} > R_{req}$, the BW is set to the value of the maximum of the six bandwidth options. The method then outputs the value of the BW, and the corresponding throughput for the cell. The method then determines a surplus traffic as the difference between $R_{req}$ and $R_{cell}$. The surplus traffic may then be carried on another carrier frequency.

Figure 3:
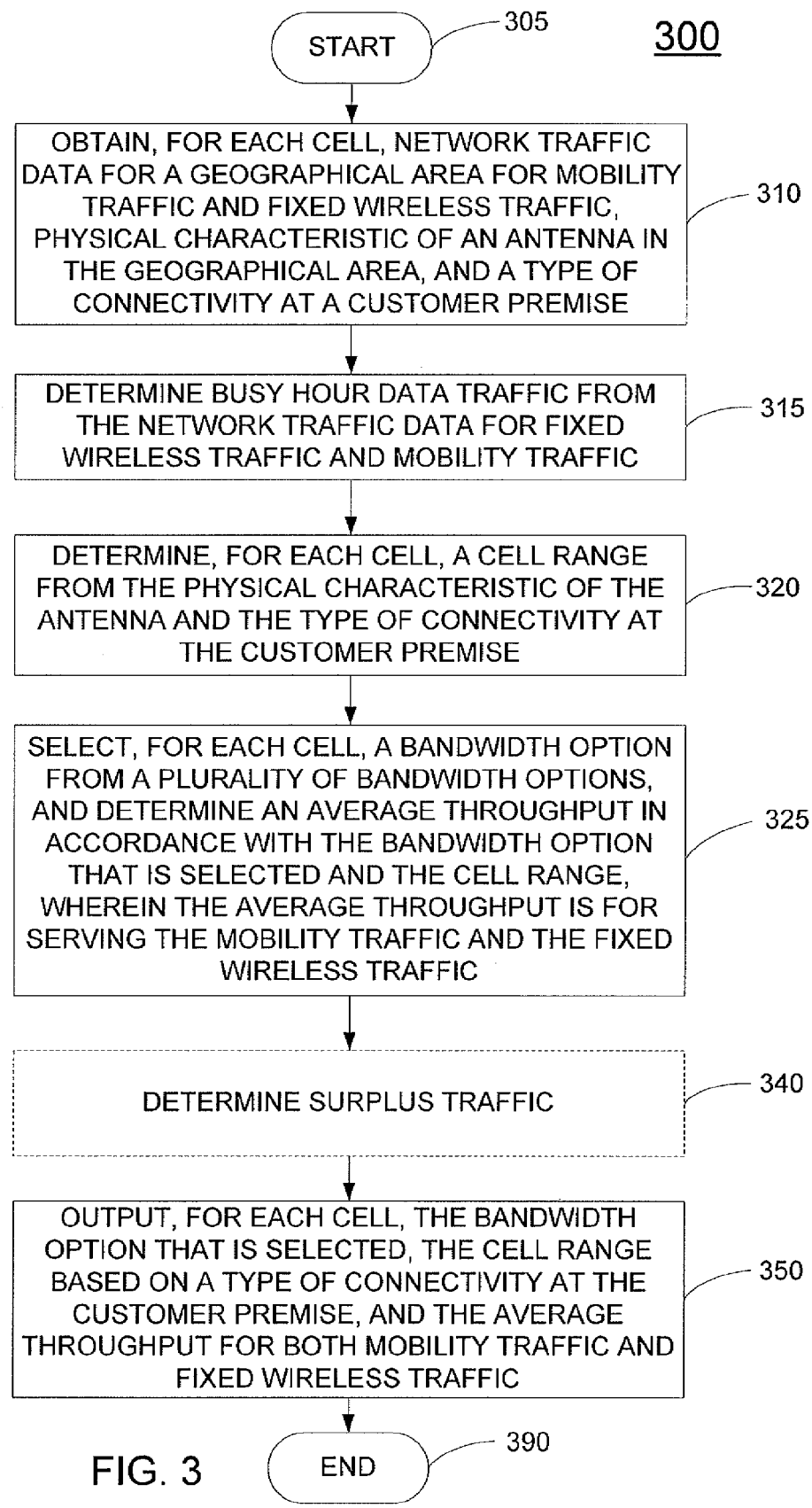
FIG. 3 illustrates a flowchart of a method for planning a radio frequency spectrum for a fixed wireless network.

FIG. 3 illustrates a flowchart of a method 300 for planning a radio frequency spectrum for a fixed wireless network. The method provides a spectrum requirement and a cell range for each cell in a geographical area. The method can be implemented in a server located in the service provider's network. For example, the method may be implemented in application server 112 deployed in core network 110 as shown in FIG. 1 or the general purpose computer illustrated in FIG. 7 below. Method 300 starts in step 305 and proceeds to step 310.

In step 310, method 300 obtains, for each cell, network traffic data for a geographical area for mobility traffic and fixed wireless traffic, physical characteristic of an antenna in the geographical area, and a type of connectivity at a customer premise. For example, the service provider may have selected a geographical area for which network planning may be needed. The method then obtains from one or more databases, server, etc., traffic data (current and forecast) for the geographical area, and physical aspects of antennas (deployed or planned to be deployed) in the geographical area, terrain of the geographical area, mix of traffic, types of antennas, types of connectivity at customer premises, and so on.

In step 315, method 300 determines busy hour data traffic from the network traffic data for fixed wireless traffic and mobility traffic. For example, the network traffic data may be analyzed to determine, for each cell, the busy hour data traffic attributed to fixed wireless traffic and the busy hour data traffic attributed to mobility traffic. The busy hour data traffic refers to the peak traffic forecast volume (throughput) and the time at which the peak traffic volume occurs. The busy hour data traffic may also be referred to as a required throughput, $R_{req}$.

Figure 4:
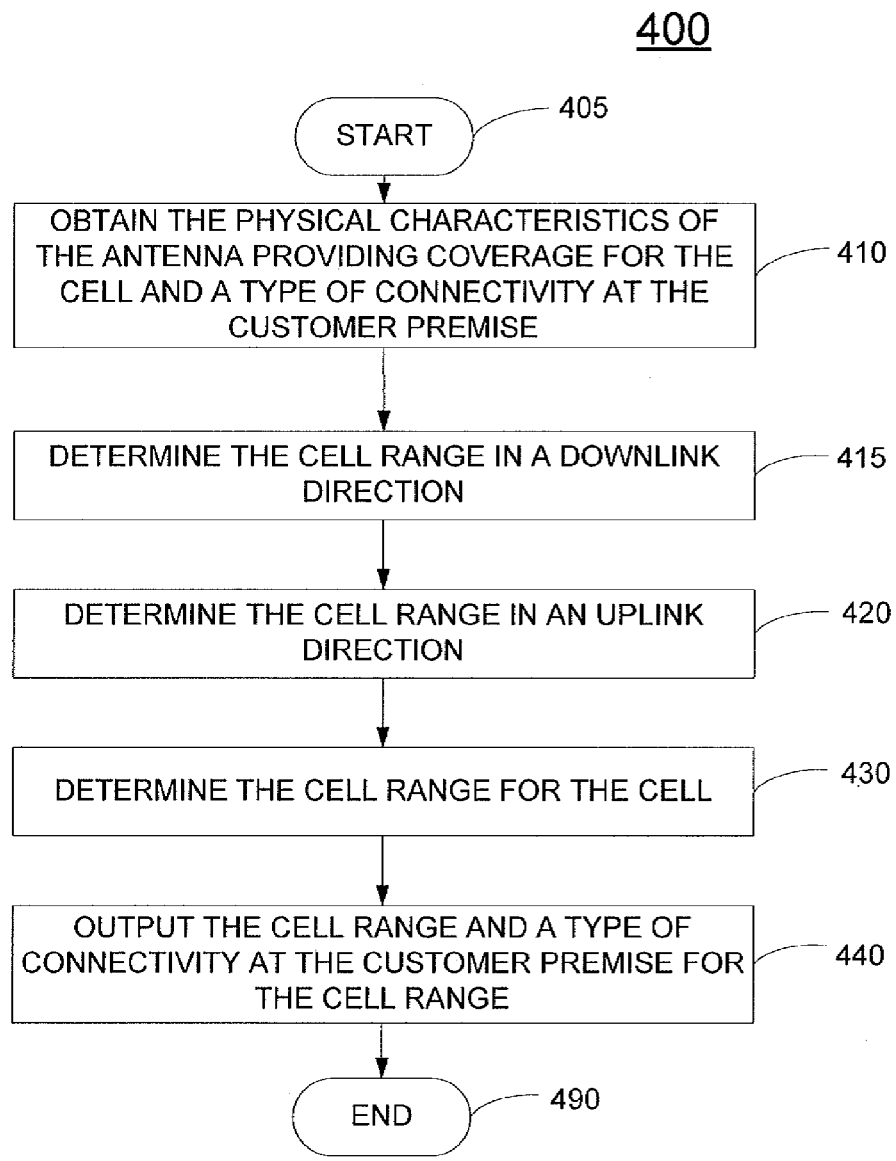
FIG. 4 illustrates a flowchart of a method for determining the cell range.

In step 320, method 300 determines, for each cell, a cell range from the physical characteristic of the antenna and the type of connectivity at the customer premise. For example, the cell range (coverage area) may be determined from the physical characteristics of the antennas in the geographical area and the type of connectivity at the customer premise. FIG. 4 (described below) illustrates a flowchart of a method 400 for determining the cell range of a cell.

Figure 5:
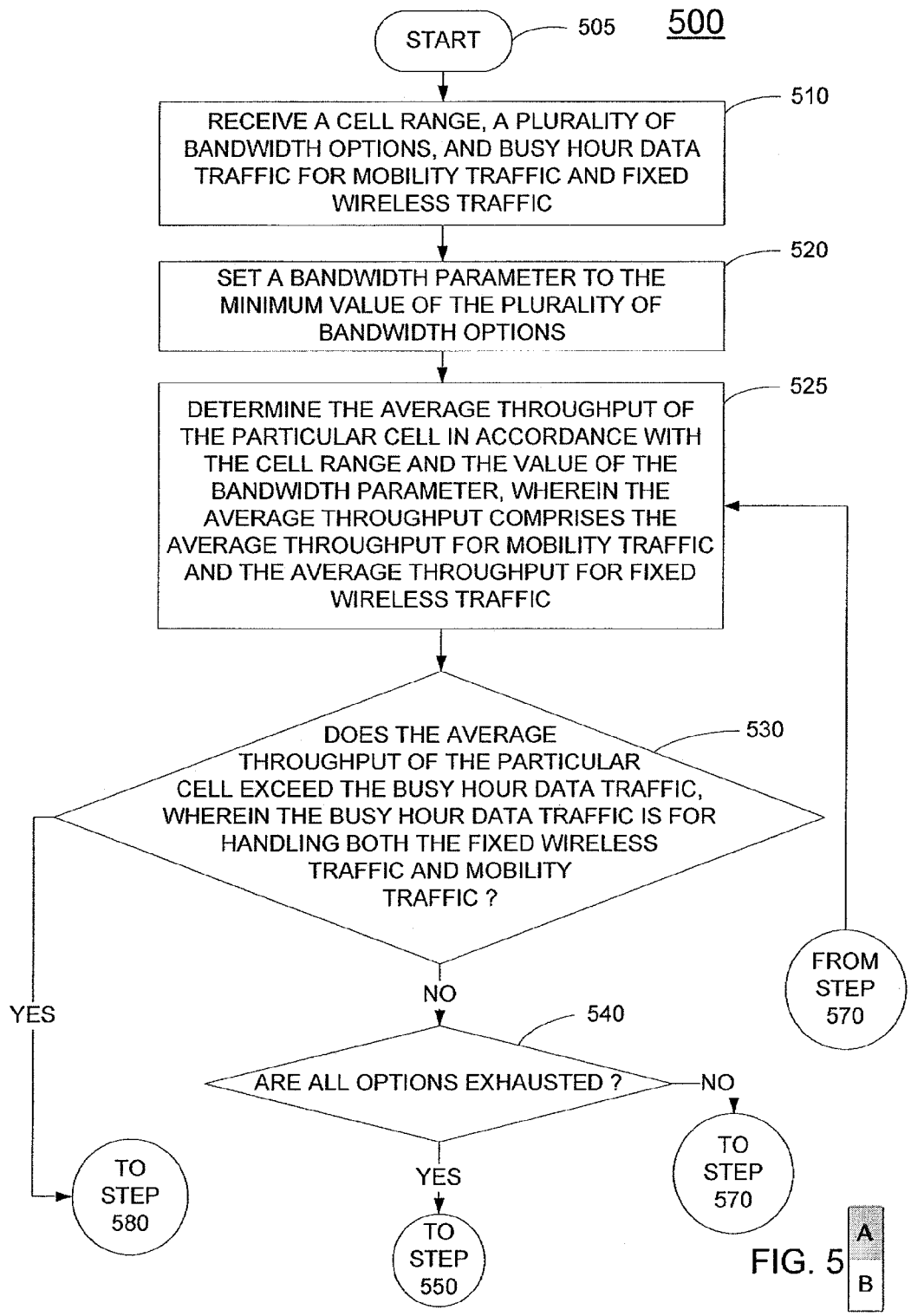
FIG. 5 illustrates a flowchart of a method for selecting, for a particular cell, a bandwidth option and determining the average throughput of the cell.

In step 325, method 300 selects, for each cell, a bandwidth option from a plurality of bandwidth options. The method also determines an average throughput in accordance with the bandwidth option that is selected and the cell range, wherein the average throughput is for serving the mobility traffic and the fixed wireless traffic. For example, the average throughput for serving the mobility traffic and the fixed wireless traffic may be derived from the average throughput of the mobility traffic and the average throughput of the fixed wireless traffic. In one embodiment, the selection of the bandwidth option is performed by determining the smallest bandwidth option, BW, from the plurality of bandwidth options such that the average throughput of the cell (for both mobility and fixed wireless traffic) exceeds the busy hour data traffic. FIG. 5 (described below) illustrates a flowchart of a method 500 for selecting the bandwidth option and determining the average throughput. In one embodiment, the plurality of bandwidth options comprises: 1.4 MHz, 3 MHz, 5 MHz, 10 MHz, 15 MHz and 20 MHz.

In optional step 340, method 300 determines if there is surplus traffic. For example, the largest bandwidth option of the plurality of bandwidth options may have a throughput that is less than the throughput needed to meet the traffic requirements for the cell for the total of the mobility traffic and fixed wireless traffic. For instance, for the example described above, BW may be set to 20 MHz and $R_{cell} < R_{req}$. Then, a plurality of carrier frequencies may be needed to meet the traffic requirements. The method may then determine the surplus traffic as: surplus traffic=$R_{req}$-$R_{cell}$. In one embodiment, method 300 receives the surplus traffic, along with the bandwidth option and the average throughput from method 500.

In step 350, method 300 outputs, for each cell, the bandwidth option that is selected, the cell range based on a type of connectivity at the customer premise, and the average throughput for both mobility traffic and fixed wireless traffic. For example, the method may output the values of: BW, cell range with an outdoor antenna at the customer premise, cell range without an outdoor antenna at the customer premise, and $R_{cell}$. If surplus traffic is also determined, the method may output the surplus traffic. For example, if $R_{req}$=22 Mbps and $R_{cell}$=20 Mbps, the method may output a surplus traffic=2 Mbps. The method proceeds to either step 390 to end processing the current network traffic data or returns to step 310 to obtain more network traffic data.

FIG. 4 illustrates a flowchart of a method 400 for determining the cell range. For example, for each particular cell, the cell range may be determined from the physical characteristics of the antenna providing coverage for the cell and a type of connectivity at the customer premise. For example, the method may be implemented in application server 112 deployed in core network 110 as shown in FIG. 1 or the general purpose computer illustrated in FIG. 7 below. Method 400 starts in step 405 and proceeds to step 410.

In step 410, method 400 obtains the physical characteristics of the antenna providing coverage for the cell and a type of connectivity at the customer premise. For example, for a particular antenna in a base station, the method obtains: a height of the antenna, a vertical beam width of the antenna, a tilt of the antenna, receiver sensitivity, fractional power control (FPC) parameters, UE power limits, and types of connectivity provided at customer premises.

In step 415, method 400 determines the cell range, $d_{dl}$, in a downlink direction. The determining of the cell range in the downlink direction is performed in accordance with the physical characteristic of the antenna, wherein the physical characteristic of the antenna comprises: a height of the antenna, a vertical beam width of the antenna, and a tilt of the antenna. In one embodiment, the cell range in the downlink direction is based on the type of connectivity at the customer premise.

In step 420, method 400 determines the cell range, $d_{ul}$, in an uplink direction. The determining of the cell range in the uplink direction is performed in accordance with the physical characteristic of the antenna, wherein the physical characteristics of the antenna comprises: a receiver sensitivity, one or more values of fractional power control (FPC) parameters, and user endpoint device (UE) power limits. In one embodiment, the cell range in the uplink direction is based on the type of connectivity at the customer premise.

In one embodiment, the determining of the cell range in the uplink direction is performed by first performing link budget analysis to calculate a maximum path loss budget for the uplink direction. The path loss budget is then mapped to the frequency range used for uplink transmission in accordance with the carrier frequencies being used for uplink transmission and a propagation model for radio waves. The cell range in the uplink direction for the particular carrier frequency and path loss budget is then determined.

In step 430, method 400 determines the cell range for the cell (both uplink and downlink transmission). The cell range is determined as the minimum of the cell range in the uplink direction and the cell range in the downlink direction. For example, the cell range for the cell may be derived as follows: cell range=min$\{d_{ul}, d_{dl}\}$. In one embodiment, the cell range is based on the type of connectivity at the customer premise. For example, the cell range may be based on an availability of an outdoor antenna at the customer premise.

In step 440, method 400 outputs the cell range and a type of connectivity at the customer premise for the cell range. For example, the method provides the cell range along with the assumption made regarding the type of connectivity at the customer premise to an application server that performs method 300. The method then ends in step 490.

Note that method 400 above determined the cell range based on an assumption of availability of tilt angles for antennas in the geographical area. However, the available data may vary. Thus, the cell range may be determined using the available data. For example, for each antenna, if the tilt angle for the antenna is provided, the method may use equation (1) to approximate the range in a chosen direction. If the tilt angle is not available but the transmitted power level, the minimum limit on the received signal strength, and the carrier frequency are known, the method may use equation (6). If both the tilt angle and the power levels are available, the method may use equation (7) and so on. In addition, if the tilt angle is small, it is assumed that the coverage for the particular cell is limited by the cell range in the uplink direction.

FIG. 5 illustrates a flowchart of a method 500 for selecting, for a particular cell, a bandwidth option and determining the average throughput of the cell in accordance with the bandwidth option that is selected, wherein the average throughput comprises the average throughput for mobility traffic and the average throughput for fixed wireless traffic. The selection of the bandwidth option is performed by determining the smallest bandwidth option, BW, from a plurality of bandwidth options such that the average throughput of the cell exceeds the busy hour data traffic for both the mobility traffic and the fixed wireless traffic. For example, the method may be implemented in application server 112 deployed in core network 110 as shown in FIG. 1 or the general purpose computer illustrated in FIG. 7 below. Method 500 starts in step 505 and proceeds to step 510.

In step 510, method 500 receives for the particular cell: a cell range, a plurality of bandwidth options, and busy hour data traffic for mobility traffic and fixed wireless traffic. In one example, the method may retrieve the cell range, the plurality of bandwidth options, the busy hour data traffic for fixed wireless traffic, the busy hour data traffic for mobility traffic, etc. from a server or a database. The plurality of bandwidth options is a list of values of bandwidths for setting a parameter BW. In another example, an application server that performs the method 300 may provide as input: the cell range, the plurality of options for BW, and the busy hour data traffic for each of the fixed wireless traffic and the mobility traffic. For example, a selected option for BW and a throughput for the cell for handling both the fixed wireless traffic and the mobility traffic may then be returned to the application server. The application server may use the selected option and throughput in step 325, as described above.

In step 520, method 500 sets a bandwidth parameter, BW, to the minimum value of the plurality of bandwidth options. For example, for the six bandwidth options described above, the method sets BW to 1.4 MHz. It should be noted that the present disclosure is not limited to only the six bandwidth options described above. Namely, any number of bandwidth options is within the scope of the present disclosure depending on the requirements of a particular network.

In step 525, method 500 determines the average throughput of the particular cell, $R_{cell}$, in accordance with the cell range of the particular cell and the value of the bandwidth parameter BW, wherein the average throughput comprises the average throughput for mobility traffic and the average throughput for fixed wireless traffic. For example, one or more analytical models and simulation tools may be used to determine the average throughput of the cell for handling the total of the fixed wireless traffic and the mobility traffic, from the cell range and the BW. Note that the cell range may be dependent on whether or not an outdoor antenna is provided at the customer premise.

In step 530, method 500 determines if the average throughput of the particular cell exceeds the busy hour data traffic, wherein the busy hour data traffic is for handling both the fixed wireless traffic and mobility traffic. For example, the method may determine if $R_{cell}>R_{req}$, wherein the required throughput is for handling both the fixed wireless traffic and the mobility traffic. If $R_{cell}>R_{req}$, the method proceeds to step 580. Otherwise, the method proceeds to step 540.

In step 540, method 500 determines if all options are exhausted. If the throughput of the cell is less than the busy hour data traffic, while the bandwidth option is set to the maximum of the plurality of bandwidth options, then all options are exhausted. For example, the throughput of the cell may be less than the required throughput to meet the traffic needs. For example, $R_{cell}<R_{req}$ and BW may be already set to the maximum of the plurality of options. If all options are exhausted, the method proceeds to step 550. Otherwise, the method proceeds to step 570.

In step 550, the method selects the maximum bandwidth option, BW, from the plurality of bandwidth options. For example, the maximum bandwidth option is selected. However, the average throughput of the cell may still not exceed the busy hour data traffic. For example, $R_{cell}<R_{req}$, while the maximum value is selected for BW. The method then proceeds to optional step 555.

In optional step 555, method 500 determines a surplus traffic. For example, the surplus traffic may be determined as the difference between $R_{req}$ and $R_{cell}$. For example, the surplus traffic may be determined and another carrier frequency may be used for the surplus traffic. The method then proceeds to step 580.

In step 570, method 500 sets the value of the bandwidth parameter BW to the next higher value of the plurality of bandwidth options. For example, for the six options described above, if BW=1.4 MHz in the previous iteration, the BW is set to the next higher setting for the present iteration. For example, BW=3 MHz for the present iteration. Similarly, if BW=3 MHz in the previous iteration, the BW is set to 5 MHz for the present iteration. The method then proceeds to step 525.

In step 580, the method outputs, for the cell, the value of the bandwidth parameter BW and the throughput, wherein the throughput comprises the throughput for providing service to both the mobility traffic and fixed wireless traffic. For example, the method may output a selected bandwidth option (i.e., a value of the parameter BW selected from the six values described above such that $R_{cell}>R_{req}$) and the average throughput for the cell associated with the selected BW and the cell range. For example, the method may output the value of BW and the corresponding value of $R_{cell}$. If surplus traffic is found in step 555, the method may also output the surplus traffic. The method then ends in step 590.

Note that, in the above description, a carrier frequency band is distinguished by a nominal frequency (e.g., 700 MHz, 850 MHz, 1900 MHz, etc.). However, each carrier frequency band may be comprised of multiple bandwidth blocks, with each bandwidth block of a particular carrier frequency band carried over a distinct carrier frequency within the particular carrier frequency band. For example, for the LTE, the bandwidth of each block may be a selection from: 1.4 MHz, 3 MHz, 5 MHz, 10 MHz, 15 MHz and 20 MHz.

In one embodiment, the spectral bandwidth available across all blocks comprising a particular frequency band is limited. For example, let a particular frequency band be denoted by $f_i$ and the aggregate spectrum bandwidth of the particular frequency band be denoted by $S(f_i)$. Then, $S(f_i)$ is limited. If the $S(f_i)$ is less than the maximum bandwidth for the LTE, it may impose additional constraints on the allowed bandwidths. For example, if $S(f_i)=12$ MHz, the bandwidth options are limited to 1.4 MHz, 3 MHz, 5 MHz and 10 MHz—as the 15 MHz and 20 MHz options clearly exceed the aggregate spectrum bandwidth for $f_i$. As such, the planning may be improved by employing a multi-carrier plan. The present method provides a multi-carrier planning of spectrum.

As described above, in order to meet traffic requirements with the smallest value of BW, the spectrum is allocated successively from one carrier frequency to the next. In one embodiment, if there are multiple blocks within the same carrier frequency band, the multiple blocks may first be allocated successively, before proceeding to the next frequency band. For example, the spectrum may be assigned within a particular $f_i$ until the aggregate spectrum $S(f_i)$ is exhausted. Then, if the aggregate spectrum for $f_i$ is exhausted, blocks in the next frequency band, e.g. blocks in frequency band $f_{i+1}$, may be used.

Figure 6:
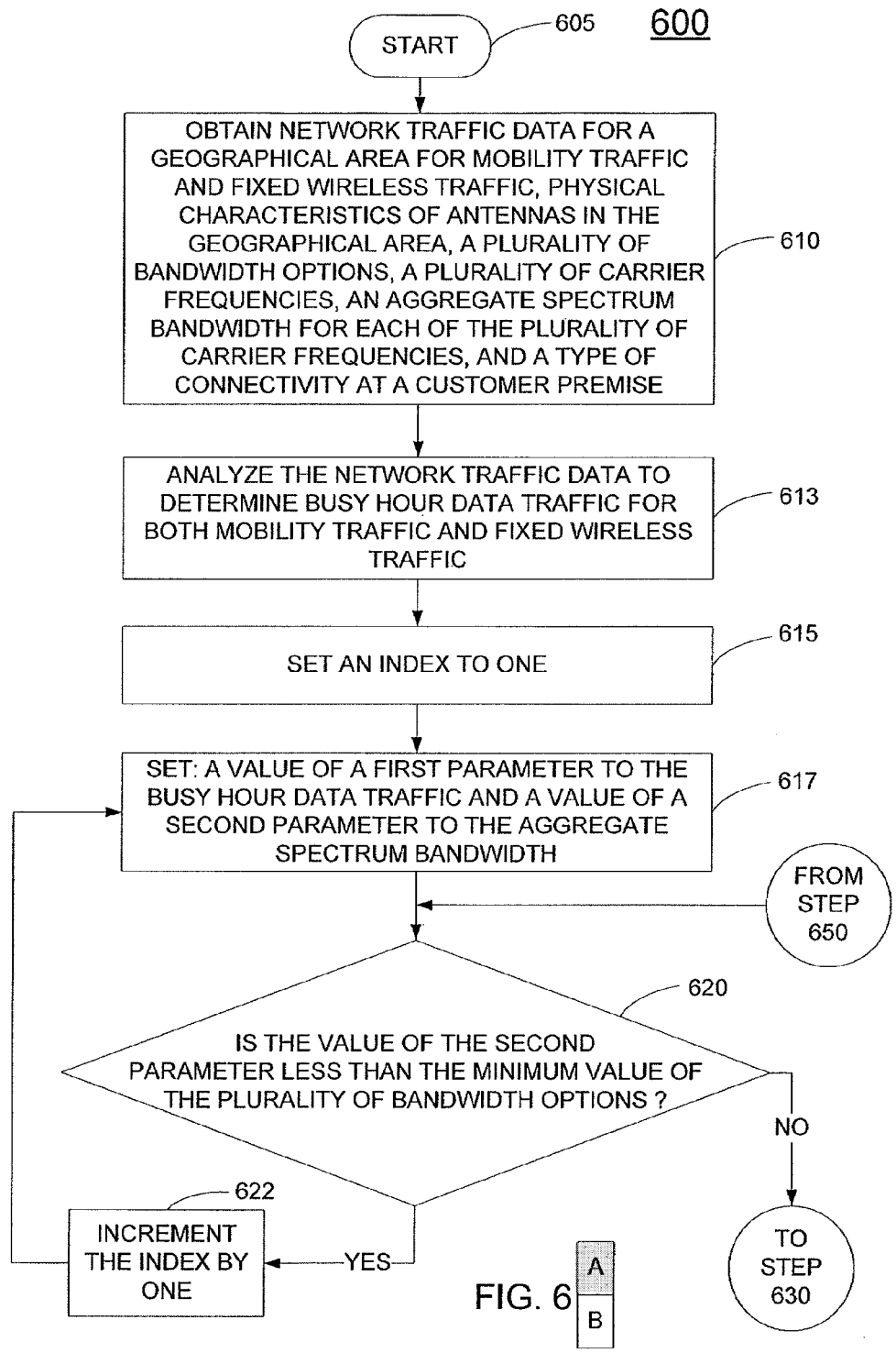
FIG. 6 illustrates a flowchart of a method for providing a multi-carrier frequency spectrum planning for a fixed wireless network.
Figure 7:
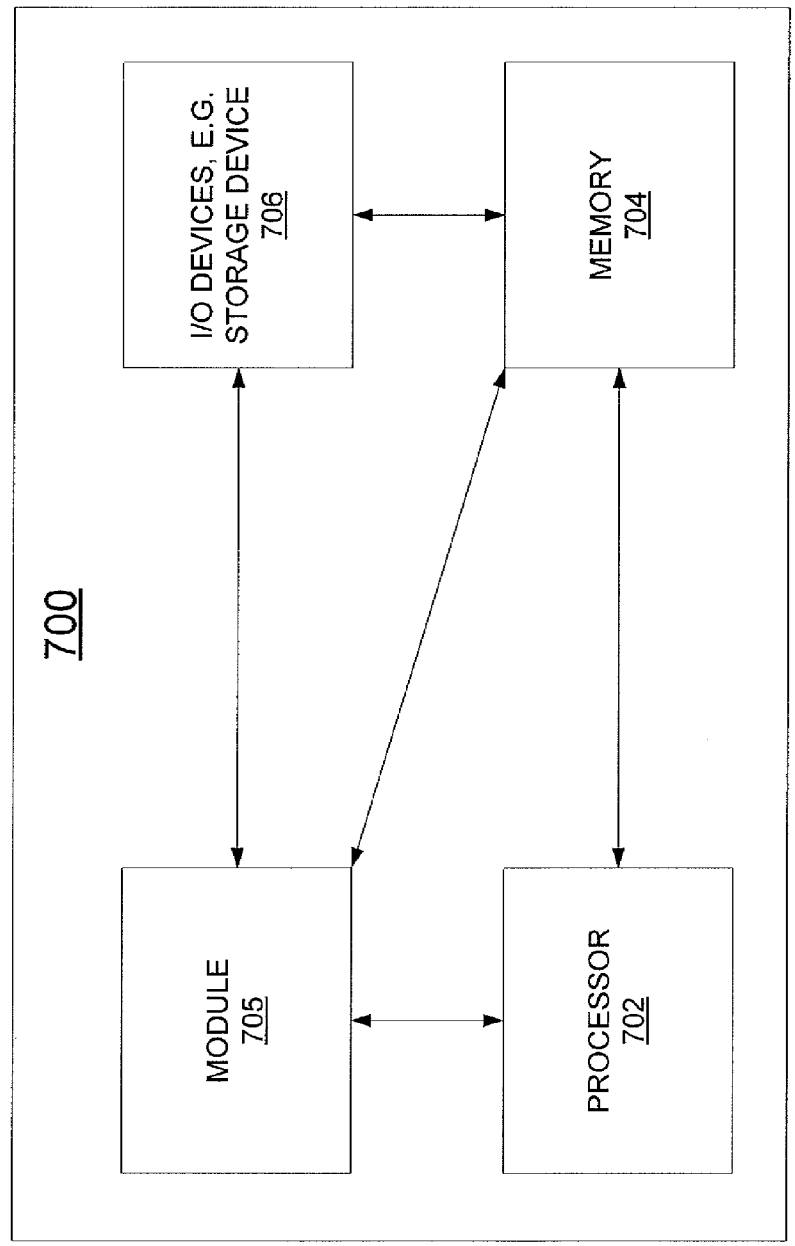
FIG. 7 depicts a high-level block diagram of a general-purpose computer suitable for use in performing the functions described herein.

FIG. 6 illustrates a flowchart of a method 600 for providing a multi-carrier frequency spectrum planning for a fixed wireless network. The method can be implemented in a server located in the service provider's network or a general purpose computer as illustrated in FIG. 7 below. For example, the method may be implemented in application server 112 as shown in FIG. 1. Method 600 starts in step 605 and proceeds to step 610.

In step 610, method 600 obtains network traffic data for a geographical area for mobility traffic and fixed wireless traffic, physical characteristics of antennas in the geographical area, a plurality of bandwidth options, a plurality of carrier frequencies, an aggregate spectrum bandwidth for each of the plurality of carrier frequencies, and a type of connectivity at a customer premise.

In step 613, method 600 analyzes the network traffic data to determine busy hour data traffic for both mobility traffic and fixed wireless traffic. For example, the network traffic data may be analyzed to determine, for each cell, the busy hour data traffic $R_{req}$ for both mobility traffic and fixed wireless traffic.

In step 615, method 600 sets an index to one. For example, there may be n carrier frequencies. The carrier frequencies may be represented by $f_1, f_2, \ldots, f_n$. The method then allocates traffic to $f_1$, then to $f_2$, and so on. The index is set to one, such that traffic is first allocated to the carrier frequency $f_1$.

In step 617, method 600 sets: a value of a first parameter traffic to the busy hour data traffic, $R_{req}$, and a value of a second parameter spectrum to the aggregate spectrum bandwidth $S(f_i)$.

In step 620, method 600 determines if the value of the second parameter, spectrum, is less than the minimum value of the plurality of bandwidth options. For the example above, $S(f_i)$ may be less than 1.4 MHz. If the value of the second parameter is less than the minimum value of the plurality of bandwidth options, the method proceeds to step 622. Otherwise, the method proceeds to step 630.

In step 622, method 600 increments the index by one. For example, the index in incremented by one until a carrier frequency with $S(f_i)$ above the minimum value of the plurality of bandwidth options is found. The method then returns to step 617.

In step 630, method 600 selects a bandwidth option from a plurality of bandwidth options wherein the bandwidth option that is selected is bounded by the aggregate spectrum bandwidth, and determines an average throughput for the cell, wherein the average throughput comprises the average throughput for handling both the mobility traffic and the fixed wireless traffic. In one embodiment, the selection of the bandwidth option is performed by using method 500. However, the bandwidth options that can be considered are limited by the spectrum constraints of the carrier frequency.

In step 640, method 600 determines if the value of the first parameter, traffic, is greater than the average throughput for the cell, as derived in step 630. If the value of the first parameter is greater than the average throughput for the cell, the method proceeds to step 650. Otherwise, the method proceeds to step 680.

In step 650, method 600 sets the value of the second parameter, spectrum, to a new value, wherein the new value is determined by subtracting the selected bandwidth option from the previous value of the second parameter. For example, the method may set spectrum as: ectrum:=spectrum−BW. Similarly, the value of the first parameter is set to a new value, wherein the new value is determined by subtracting the throughput determined in step 640 from the previous value. For example, the method may set traffic as: traffic:=traffic−$R_{cell}$. For example, if $S(f_i)$=9 MHz and BW=5 MHz, traffic=20 Mbps, and $R_{cell}$=5 Mbps, the first parameter is set to a new value by performing traffic:=20 Mbps−5 Mbps and the second parameter is set to a new value by performing spectrum:=9 MHz−5 MHz. The method then returns to step 620 to assign one or more other blocks or carrier frequencies for carrying the remaining 15 Mbps of traffic.

For example, if $S(f_1)$=8 MHz for the first carrier frequency, $R_{req}$=12 Mbps, BW is set to 5 MHz, and $k_{cell}$=5 Mbps when BW=5 MHz, the entire 12 Mbps traffic cannot be carried over the first carrier frequency range. Thus, a first block of 5 MHz and a second block of 3 MHz may be assigned in the first range of the first carrier frequency. Then, the surplus traffic is carried over the next carrier frequency. For example, 4 Mbps worth of traffic (if 5 MHz+3 MHz BW has been assumed to be able to support 8 Mbps traffic from calculations) is assigned to be carried on carrier frequency $f_2$. Hence, a plurality of carrier frequencies and a plurality of blocks may be needed to meet the traffic requirements.

In step 680, method 600 outputs, for each of the plurality of carrier frequencies, one or more bandwidth options that are selected from the plurality of bandwidth options, and a respective throughput for each of the one more bandwidth options that are selected. For example, each carrier frequency may have a plurality of blocks. Then, for each block, a bandwidth option is selected and the throughput for the block is determined. The method then provides an output for all the blocks, including the bandwidth option and throughput. The method then proceeds to either step 690 to end processing the data or returns to step 610 to obtain more data.

Those skilled in the art realize that the present invention may be applied for a network that has any plurality of bandwidth options. As such, the above description is not intended to limit the implementation to an LTE or to the six bandwidth options described above. For example, more bandwidth options may be added to increase flexibility and to carry traffic for services that require higher bandwidth.

It should be noted that although not specifically stated, one or more steps of methods 300, 400, 500 or 600 may include a storing, displaying and/or outputting step as required for a particular application. In other words, any data, records, fields, and/or intermediate results discussed in the methods 300, 400, 500 or 600 can be stored, displayed and/or outputted to another device as required for a particular application. Furthermore, steps or blocks in FIGS. 3-6 that recite a determining operation, or involve a decision, do not necessarily require that both branches of the determining operation be practiced. In other words, one of the branches of the determining operation can be deemed as an optional step.

FIG. 7 depicts a high-level block diagram of a general-purpose computer suitable for use in performing the functions described herein. As depicted in FIG. 7, the system 700 comprises a hardware processor element 702 (e.g., a CPU), a memory 704, e.g., random access memory (RAM) and/or read only memory (ROM), a module 705 for planning a radio frequency spectrum in a fixed wireless network, and various input/output devices 706 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the teachings of the present disclosure can be implemented in software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. For example, a computer-readable medium may be in communication with the processor, where the computer-readable medium having stored thereon a plurality of instructions, the plurality of instructions including instructions which, when executed by the hardware processor, cause the hardware processor to perform the methods (e.g., methods 300-600) as disclosed above.

In one embodiment, the present module or process 705 for planning a radio frequency spectrum in a fixed wireless network can be loaded into memory 704 and executed by processor 702 to implement the functions as discussed above. As such, the present method 705 for planning a radio frequency spectrum in a fixed wireless network (including associated data structures) of the present disclosure can be stored on a non-transitory (e.g., tangible or physical) computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for selecting a bandwidth option for a cell in a network, comprising:
   obtaining, by a processor, for the cell, network traffic data associated with mobility traffic and fixed wireless traffic for a geographical area, a physical characteristic of an antenna in the geographical area, and a type of connectivity at a customer premises;
   determining, by the processor, a busy time data traffic from the network traffic data for both the fixed wireless traffic and the mobility traffic;
   determining, by the processor, for the cell, a cell range from the physical characteristic of the antenna and the type of connectivity at the customer premises, wherein the determining the cell range comprises:
      determining the cell range in a downlink direction;
      determining the cell range in an uplink direction; and
      determining the cell range for the cell as a minimum of the cell range in the uplink direction and the cell range in the downlink direction;
   selecting, by the processor, the bandwidth option from a plurality of bandwidth options; and
   determining, by the processor, an average throughput in accordance with the bandwidth option that is selected and the cell range, wherein the average throughput comprises a throughput for serving both the mobility traffic and the fixed wireless traffic.

2. The method of claim 1, further comprising:
   outputting the bandwidth option that is selected, the cell range based on the type of connectivity at the customer premises, and the average throughput.

3. The method of claim 1, wherein the selecting selects a smallest bandwidth option from the plurality of bandwidth options where the average throughput of the cell exceeds the busy time data traffic for both the fixed wireless traffic and the mobility traffic.

4. The method of claim 1, wherein the selecting selects a maximum bandwidth option from the plurality of bandwidth options, if the average throughput of the cell is less than the busy time data traffic for both the fixed wireless traffic and the mobility traffic, when the bandwidth option is set to the maximum of the plurality of bandwidth options.

5. The method of claim 1, further comprising:
   determining if there is surplus traffic; and
   outputting the surplus traffic, if there is surplus traffic.

6. The method of claim 1, wherein the determining the cell range in the downlink direction is performed in accordance with the type of connectivity at the customer premises.

7. The method of claim 1, wherein the determining the cell range in the uplink direction is performed in accordance with the type of connectivity at the customer premises.

8. The method of claim 1, wherein the determining the cell range in the downlink direction is performed in accordance with the physical characteristic of the antenna, wherein the physical characteristic of the antenna comprises a height of the antenna.

9. The method of claim 1, wherein the determining the cell range in the downlink direction is performed in accordance with the physical characteristic of the antenna, wherein the physical characteristic of the antenna comprises a vertical beam width of the antenna.

10. The method of claim 1, wherein the determining the cell range in the downlink direction is performed in accordance with the physical characteristic of the antenna, wherein the physical characteristic of the antenna comprises a tilt of the antenna.

11. The method of claim 1, wherein the determining of the cell range in the uplink direction is performed in accordance with the physical characteristic of the antenna, wherein the physical characteristics of the antenna comprises a receiver sensitivity.

12. The method of claim 1, wherein the determining of the cell range in the uplink direction is performed in accordance with the physical characteristic of the antenna, wherein the physical characteristics of the antenna comprises a value of a fractional power control parameter.

13. The method of claim 1, wherein the determining of the cell range in the uplink direction is performed in accordance with the physical characteristic of the antenna, wherein the physical characteristics of the antenna comprises a user end-point device power limit.

14. The method of claim 1, wherein the plurality of bandwidth options is bounded by an aggregate spectrum bandwidth.

15. The method of claim 14, wherein the selecting the bandwidth option from the plurality of bandwidth options is performed in accordance with the aggregate spectrum bandwidth.

16. A non-transitory computer-readable medium storing instructions which, when executed by a processor, cause the processor to perform operations for selecting a bandwidth option for a cell in a network, the operations comprising:
   obtaining, for the cell, network traffic data associated with mobility traffic and fixed wireless traffic for a geographical area, a physical characteristic of an antenna in the geographical area, and a type of connectivity at a customer premises;
   determining a busy time data traffic from the network traffic data for both the fixed wireless traffic and the mobility traffic;
   determining, for the cell, a cell range from the physical characteristic of the antenna and the type of connectivity at the customer premises, wherein the determining the cell range comprises:
      determining the cell range in a downlink direction;
      determining the cell range in an uplink direction; and
      determining the cell range for the cell as a minimum of the cell range in the uplink direction and the cell range in the downlink direction;
   selecting the bandwidth option from a plurality of bandwidth options; and
   determining an average throughput in accordance with the bandwidth option that is selected and the cell range, wherein the average throughput comprises a throughput for serving both the mobility traffic and the fixed wireless traffic.

17. The non-transitory computer-readable medium of claim 16, further comprising: outputting the bandwidth option that is selected, the cell range based on the type of connectivity at the customer premises, and the average throughput.

18. The non-transitory computer-readable medium of claim 16, wherein the selecting selects a smallest bandwidth option from the plurality of bandwidth options where the average throughput of the cell exceeds the busy time data traffic for both the fixed wireless traffic and the mobility traffic.

19. An apparatus for selecting a bandwidth option for a cell in a network, comprising:
- a processor; and
- a computer-readable medium storing a plurality of instructions which, when executed by the processor, cause the processor to perform operations, the operations comprising:
  - obtaining, for the cell, network traffic data associated with mobility traffic and fixed wireless traffic for a geographical area, a physical characteristic of an antenna in the geographical area, and a type of connectivity at a customer premise premises;
  - determining a busy time data traffic from the network traffic data for both the fixed wireless traffic and the mobility traffic;
  - determining, for the cell, a cell range from the physical characteristic of the antenna and the type of connectivity at the customer premises, wherein the determining the cell range comprises:
    - determining the cell range in a downlink direction;
    - determining the cell range in an uplink direction; and
    - determining the cell range for the cell as a minimum of the cell range in the uplink direction and the cell range in the downlink direction;
  - selecting the bandwidth option from a plurality of bandwidth options; and
  - determining an average throughput in accordance with the bandwidth option that is selected and the cell range, wherein the average throughput comprises a throughput for serving both the mobility traffic and the fixed wireless traffic.

* * * * *